Nov. 18, 1958     D. D. TAYLOR     2,860,894

HIGH PRESSURE SHAFT PACKING

Filed Feb. 11, 1958

INVENTOR.
DUDLEY D. TAYLOR

BY
ATTYS.

United States Patent Office 2,860,894
Patented Nov. 18, 1958

2,860,894
HIGH PRESSURE SHAFT PACKING

Dudley D. Taylor, Hyattsville, Md., assignor to the United States of America as represented by the Secretary of the Navy Application February 11, 1958, Serial No. 714,662

8 Claims. (Cl. 286—7)

(Granted under Title 35, U. S. Code (1952), sec. 266)

The invention described herein may be manufactured and used by or for the Government of the United States of America for governmental purposes without the payment of any royalties thereon or therefor.

This invention relates to shaft packing and more particularly to a packing for sealing rotatable parts under extremely high pressures.

In various types of experimental and industrial operations involving a pressure vessel having a chamber containing fluid under extremely high pressures it is often necessary to transmit torque to the interior of the chamber by means of some form of rotatable shaft extending through the wall of the chamber. This torque or mechanical motion is required for various operations including relative adjustment of parts within the chamber, stirring contained liquids, etc.

At the present time, rotatable shafts may be sealed against pressures up to 35 thousand pounds per square inch by using various types of packings and packing designs. However, when the pressure exceeds 35 thousand pounds per square inch these prior art devices tend to leak excessively. Actually some laboratory equipment used in high-pressure experimental work requiring the use of the aforementioned mechanical motion may be rated as high as 140 thousand pounds per square inch. The term "high-pressure" as employed herein may be defined as a pressure in excess of 35 thousand pounds per square inch. Conventional sealing means are completely inadequate when employed in this range above 35 thousand pounds per square inch. The only technique known to seal a shaft satisfactorily under these extremely high pressures uses a separate secondary pressure system to squeeze a metal cylinder around the shaft. Such a system is unsatisfactory due mainly to the large torque required to rotate the shaft under the frictional influence of the metal-to-metal contact between the cylinder and the shaft. When the squeeze pressure is reduced enough to permit rotation of the shaft, leakage occurs. Furthermore, such a secondary pressure system unavoidably adds a unit of large size and weight to the apparatus.

Accordingly, an object of the present invention is the provision of a means to seal a rotating shaft against extremely high pressures with an extremely small rate of leakage.

Another object is to provide a new and improved shaft packing which requires only a small torque to rotate the shaft when a high pressure is applied thereto.

A further object of the invention is the provision of a self-contained shaft packing for a high pressure system which will utilize the thrust force along the axis of the shaft to accomplish an effective seal without the use of a separate secondary pressure system.

Another object of this invention is the provision of a shaft seal for a high pressure system which is simple in design, reliable in operation, economical to manufacture and easily repaired or replaced.

Other objects and advantages of the invention will appear in the course of the following detailed description of a preferred embodiment of the present invention, taken in conjunction with the accompanying drawing in which.

Figure 1:
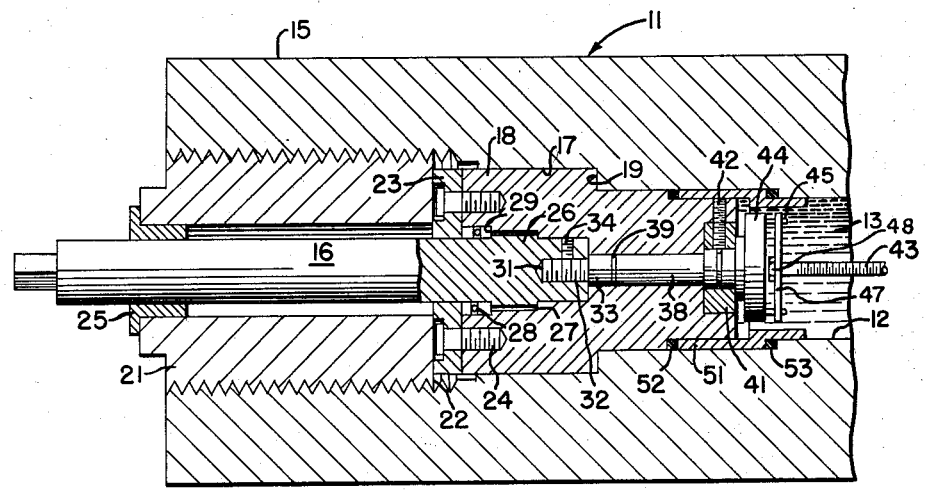
Fig. 1 is a sectional view of a rotating shaft assembly employing the improved packing means of the present invention according to a preferred embodiment thereof.

Referring to Fig. 1 of the drawing there is shown thereon for purposes of illustration, the device of the present invention used in conjunction with an acoustic interferometer generally designated as 11 and having an internal pressure chamber 12. When the apparatus is in use, chamber 12 contains a liquid medium 13 under extremely high hydrostatic pressure. An apparatus of this type is frequently rated at 140,000 pounds per square inch. In this particular illustration precise controlled lateral mechanical movement of an acoustic interferometer reflector, not shown, selectively in either direction is required in order to make predetermined adjustments during experimental work.

To accomplish this movement a moveable mechanical connection between the reflector and the exterior of wall 15 of the interferometer is required. To provide this mechanical connection a rotatable shaft 16 is centered axially in a stepped opening 17 connecting the pressure chamber with the exterior of the apparatus. The inner portion of the stepped opening accommodates a complementary closure plug 18 which, in its assembled position, is held in place between the annular radial wall 19 of the opening and a threaded closure nut 21. This closure nut is received by the threaded outer portion of the wall opening and has an inner face 22 which contacts a bearing plate 23 which in turn is secured to the outer face of the closure plug by means of screws 24 shown in Fig. 1.

Both closure plug 18 and closure nut 21 have axial openings extending therethrough to receive the rotatable shaft assembly. The outer portion of shaft 16 is held in place by means of a nylon bushing 25 and the inner end of the shaft is retained in a complementary portion of the axial opening in closure plug 18. To prevent axial movement of the shaft, it is provided with an annular protuberance 26 held in place between a radial bearing surface 27 formed within the closure plug and a ball-type thrust bearing 28 which in turn is confined between a second bearing surface 29 formed in the closure plug and the inner face of the aforementioned bearing plate 23.

Figure 2:
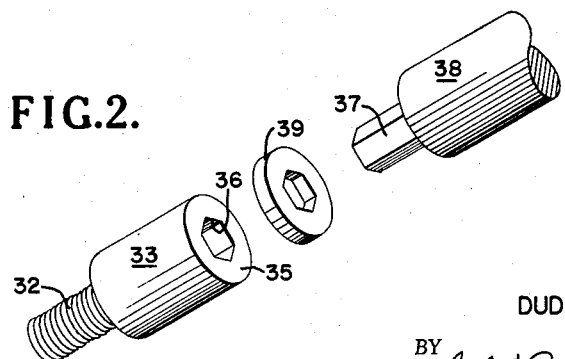
Fig. 2 is an enlarged exploded view in perspective of that portion of the rotating shaft which cooperates directly with the packing.

The innermost end of the shaft 16 is so constructed as to connect with a two-part shaft extension shown in the exploded view, Fig. 2. An axially aligned opening 31 is formed in the end face of the shaft (Fig. 1) and receives a mating stem 32 which comprises a reduced portion of insert 33 comprising one section of the aforesaid two-part shaft extension. For purposes of illustration, the stem 32 and its receiving opening 31 have been shown as threaded with the stem retained in place by a setscrew 34 to securely connect the insert with shaft 16. It is, of course, obvious that other connecting arrangements could be used. For example, stud 32 and its receiving recess need not be threaded but instead the setscrew could be replaced by a locking pin which would extend radially into shaft 16 and an aligned hole provided in stud 32 whereby relative rotative movement between the insert and the shaft would be prevented.

Referring now specifically to Fig. 2 it will be seen that one face 35 of the insert member is provided with a non-circular recess or bore 36 adapted to receive a male stud 37 formed as a reduced portion of the second member 38 of the two-part shaft extension. Stud 37 has a cross-sectional configuration which is complementary with recess 36 and although shown for purposes of illustration as hexagonal, it is to be understood that the configuration of the lug and recess could be square or any other non-circular design. An apertured seal washer 39 is positioned between the two portions of the two-piece shaft extension and fits around the periphery of stud 37 to which it is keyed, preferably as shown. The washer is of low shear strength material such as copper, lead, "Teflon" or other similar materials which will "flow" under pressure. "Teflon" is a polymerized tetrafluoro-ethylene plastic made by the E. I. DuPont Company.

Figure 3:
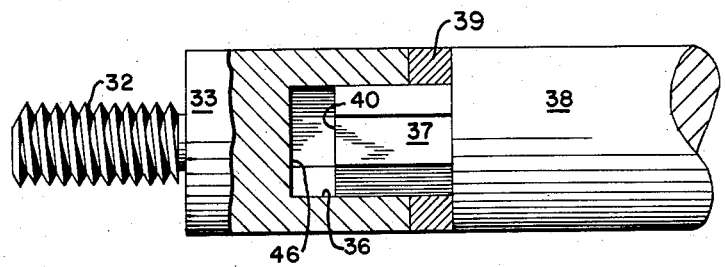
Fig. 3 is a greatly enlarged partial sectional view of that portion of the rotating shaft and washer seal of Fig. 2.

As best seen in Fig. 3 it is important that the combined depth of the opening through seal washer 39 and recess hole 36 be greater than the axial length of stud 37. This construction insures that the end face 40 of the stud remains out of contact with and unsupported by the end wall 46 of hole 36 in the insert. This increases the resulting pressure on seal washer 39, the purpose of which will be better understood as the description of the invention progresses.

Referring again to Fig. 1 of the drawing it will be seen that section 38 of the shaft extension is supported for rotation by the bearing ring 41 and held in place by a setscrew 42 located in the end portion of closure plug 18. The shaft extension is further mechanically connected to a threaded rod 43 which must be rotated to produce the desired mechanical movement within the pressure chamber 12. In the embodiment shown this mechanical connection is effected by providing the shaft extension 38 with an enlarged portion 44 having integrally attached to one face thereof a plurality of connecting pins 45. These pins extend freely through a like number of aligned holes formed in plate 47 which in turn is fixedly attached to rod 43 and held in place by means of a securing nut 48 or the like. Conventional means, not shown, threaded on the rod may be employed to convert the rotary motion of rod 43 selectively to reciprocating axial motion needed to move the reflector.

A packing gland 51 which fits telescopically over the inner end portion of the closure plug 18 retains a pair of metallic O rings 52 and 53. These rings act under pressure to assist in preventing leakage around the peripheral surfaces of both closure plug 18 and closure nut 21.

In operation, the present invention utilizes the hydrostatic pressure of the liquid medium contained in a pressure vessel, such as the pressure vessel 12, to effect a seal against leakage around a rotatable shaft communicating therewith. As the pressure in the vessel is increased, a thrust force of increasing strength is generated along the axis of the shaft. Since the receiving hole 36 in the insert portion of the shaft extension, Fig. 3, is so constructed so as to insure relative axial movement between sections 33 and 38 of the shaft, the aforesaid thrust force compresses the washer or seal 39 causing it to extrude radially and into sealing contact with the surrounding bore of the closure plug. Due to the unsupported area of the shaft, namely the cross-sectional area 40 of stud 37, the pressure per unit area exerted on the seal washer and accordingly by the washer against the bore of the closure plug, will be higher than the hydrostatic pressure being confined thus effecting a high pressure seal. Due to the small area of contact between the seal washer and the surrounding bore, the shaft 16 may be rotated with a relatively small amount of torque applied to its outer end. Six to eight foot-pounds of torque has been determined to be adequate even under the extremely high hydrostatic pressures involved, as opposed to approximately 100 foot-pounds required under sealing means which incorporate a separate secondary pressure system. This low torque requirement permits the utilization of components of comparatively small diameter in the rotatable shaft assembly since the risk of failure by shear is held to a minimum.

From the foregoing description of the present invention, it will be seen that a simply designed packing construction has been provided which utilizes the confined hydrostatic pressure thereby eliminating the necessity of any secondary pressure source to effect an adequate high pressure seal. This arrangement has made possible the rotation of a shaft subjected to extremely high pressures with but a small torque applied thereto while at the same time an effective seal assures against any appreciable drop in the high pressure within the pressure vessel.

It should be understood that the foregoing disclosure relates to only a preferred embodiment of the invention which gives satisfactory results and that it is intended, in the appended claims, to cover all changes and modifications of the example of the invention herein disclosed for the purposes of the disclosure, which do not constitute a departure from the spirit and scope of the invention.

What is claimed as new and desired to be secured by Letters Patent of the United States is:

1. In a pressure vessel having a wall bore connecting a high-pressure chamber and the exterior of the vessel, a two-part shaft, means rotatably mounting said shaft in the wall bore, means preventing axial movement of the first part of said shaft, means connecting said parts for mutual rotation, means allowing axial movement of the second part of the shaft relative to said first part, means communicating pressure from said chamber for applying an axial thrust to said second part in a direction toward said first part, and a deformable seal between said parts and having its periphery in contact with said bore, whereby relative axial movement between the shaft parts will cause extrusion of the seal toward the surface of the bore.

2. The device of claim 1 in which said second part has a surface area subject to axial thrust from the chamber pressure and means for applying the total thrust pressure received by said surface area to a lesser area of said seal.

3. The device of claim 1 in which one part of said shaft is provided with a non-circular opening coaxial therewith, the other part of the shaft having a matching non-circular stud slideably received by said opening, said seal having an axial hole therethrough to permit insertion of said stud into said opening, the combined depth of the hole and the opening being greater than the length of the stud whereby the stud remains free from axial bearing contact with said part containing the opening.

4. In a pressure vessel having a wall bore connecting a high-pressure chamber and the exterior of the vessel, a torque transmitting rod, means mounting said rod for rotation but preventing axial movement thereof, said rod having one end thereof terminating in the bore, said end being provided with an axial opening therein, a rod extension element having one end thereof adapted to be fixedly secured to said rod end, a second extension element adjacent the other end of said rod extension element, means interconnecting said elements for mutual rotation, means permitting axial movement of said second element relative to the first said element, means communicating pressure from said chamber for applying an axial thrust to said second element in a direction toward the first said element, and a seal of deformable material disposed between said elements and having an annular periphery in contact with the bore, whereby relative axial movement between the extension elements will cause extrusion of the seal toward the surface of the bore.

5. The device of claim 4 in which said second extension element has a surface area subject to axial thrust from said chamber pressure and means for applying the total thrust pressure received by said surface area to a lesser area of said seal.

6. The device of claim 4 in which one of said extension elements is provided with an axial opening having a non-circular cross-sectional configuration, the other of said elements having a matching non-circular stud slideably received by said opening, said seal having an axial hole therethrough to permit insertion of said stud into said opening, the combined depth of the hole and the opening being greater than the length of the stud whereby the stud remains free from axial bearing contact with said element containing the opening.

7. A shaft packing device for use within a bore comprising a two-piece shaft, means for mounting said shaft in said bore for rotation but preventing axial movement of one piece while permitting axial movement of the other, said pieces being juxtaposed in axial alignment, an annular seal of deformable material between said shaft pieces, one of said pieces having an axially extending non-circular stud thereon, said seal having a non-circular hole and said other piece having a non-circular well therein to slideably receive said stud, the depth of said well and the thickness of said seal being greater than the length of the stud, and means for providing said axially movable piece with an axial thrust in the direction of said axially immovable piece.

8. A device according to claim 7 in which means are provided for keying said seal to said shaft.

References Cited in the file of this patent

UNITED STATES PATENTS

| 1,519,446 | Flowers | Dec. 16, 1924 |
| 2,744,777 | Mucher | May 8, 1956 |